Oct. 3, 1967 — A. DE ANGELIS — 3,345,121
ADJUSTABLE NOSEPIECE FOR EYEGLASS FRAME
Filed Jan. 28, 1964 — 2 Sheets-Sheet 1
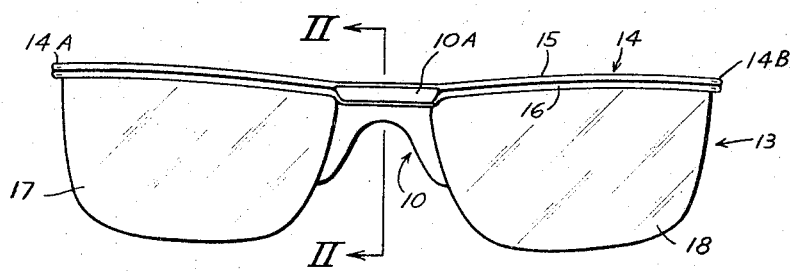
FIG. I
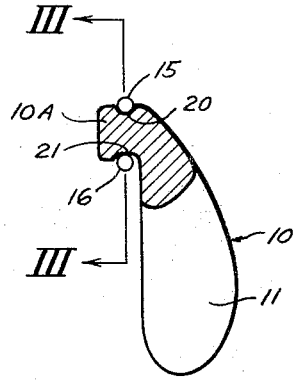
FIG. II
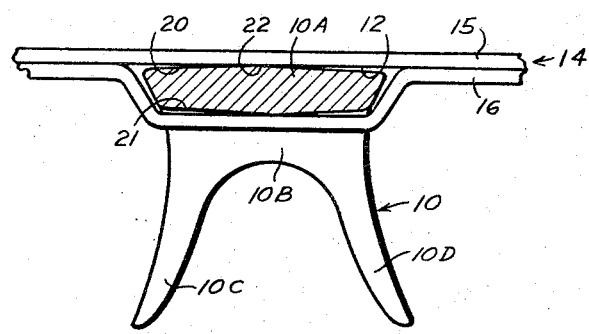
FIG. III
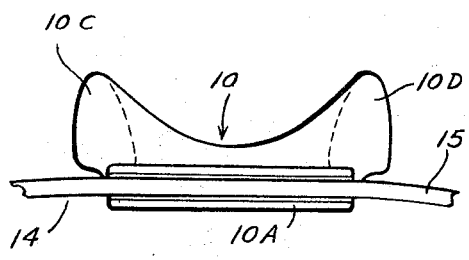
FIG. IV
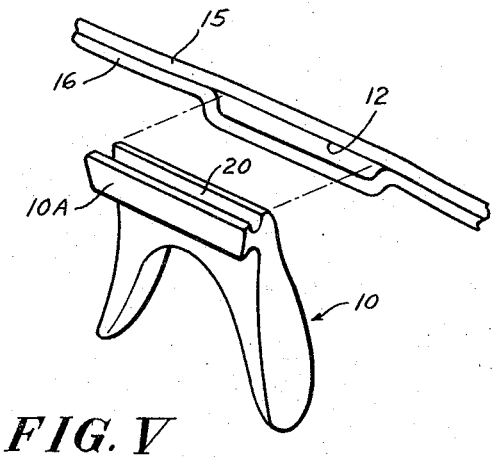
FIG. V
INVENTOR
ARMAND DeANGELIS
BY
SCHULZE, BLAIR & BENOIT
ATTORNEYS

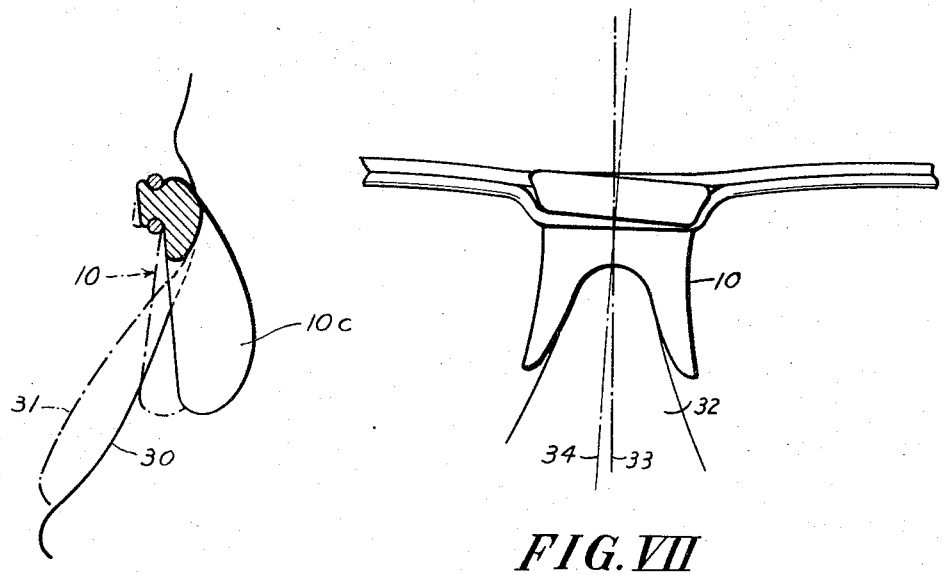
FIG. VI    FIG. VII
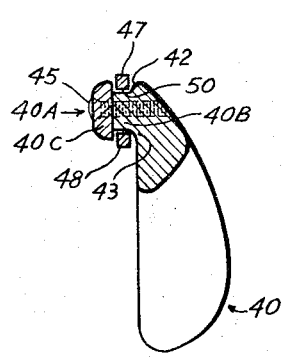
FIG. IX
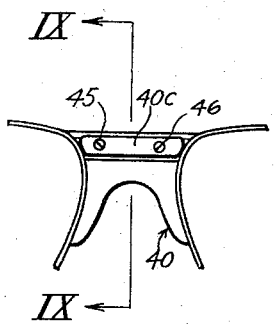
FIG. VIII

United States Patent Office 3,345,121
Patented Oct. 3, 1967

3,345,121
ADJUSTABLE NOSEPIECE FOR
EYEGLASS FRAME
Armand De Angelis, Southbridge, Mass., assignor to
Omnitech, Inc., Dudley, Mass., a corporation of
Massachusetts
Filed Jan. 28, 1964, Ser. No. 340,695
2 Claims. (Cl. 351—130)

ABSTRACT OF THE DISCLOSURE

An eyeglass frame having an aperture in the bridge portion which is dimensioned so as to receive a section of a nosepiece member in a manner such that the nosepiece is free to move forwardly and rearwardly and also swing sideways to the degree necessary to adjust to the shape of the nose of the wearer.

---

This invention relates to an adjustable nosepiece for ophthalmic or non-ophthalmic mountings.

One of the objects of this invention is to provide a nosepiece for a mounting or frame which is simple, practical and thoroughly durable. Another object is to provide a nosepiece of the above character which is neat and attractive in appearance. Another object is to provide a nosepiece of the above character which may be manufactured from inexpensive materials without undue labor costs. Still another object is to provide a nosepiece of the above character constructed to be able to withstand continuous hard usage. A still further object is to provide a nosepiece which will result in a maximum of comfort to the wearer. Another object is to provide a nosepiece of the above character which automatically adjusts itself to the nose of the wearer when the frame is in use. Other objects will be in part obvious and in part pointed out hereinafter.

This invention consists in the features of construction, combinations of elements, and arrangements of parts which will be exemplified in the structure to be hereinafter described, and the scope of the application which will be indicated in the following claims:

As conducive to a clearer understanding of certain features of this invention, it might here be pointed out that the pads of a frame rarely fit the nose of the wearer. This is caused by the fact that we are a mixture of many different races with the end result that no two noses are identical in contour. Furthermore, opposite sides of noses are not symmetrical. Accordingly, to achieve a comfortable fit, adjustable pads must be used so that they can be adjusted to properly contact the surfaces of the nose being fitted. If adjustable pads are not used, the surfaces of the pads do not conform to the surfaces they contact and furthermore, one pad may exert more pressure on one side of the nose than the other. This may cause extreme discomfort to the wearer. It is accordingly another object of this invention to provide a nosepiece which will automatically adjust its position to the shape of the nose of the wearer.

For purposes of description, the terms "upwardly" and "downwardly" wherever used in the specification and claims will mean directions upwardly and downwardly respectively on the face of the wearer when the glasses are in use. The term "outwardly" will mean a direction outwardly from the sides of the nose of the wearer toward the sides of the head while the term "inwardly" will mean the opposite direction. The term "rearwardly" will mean a direction toward the face of the wearer while "forwardly" will denote the opposite direction.

Referring now to the drawing in which is shown one of the various possible embodiments of this invention, FIG. 1 is a front elevation of a frame having my new improved nosepiece structure;

FIG. 2 is a vertical section on an enlarged scale taken on the line 2—2 of FIGURE 1;

FIG. 3 is a vertical section of the adjustable nosepiece structure taken on the line 3—3 of FIGURE 2;

FIG. 4 is a top plan view on an enlarged scale of the bridge portion of the frame shown in FIGURE 1;

FIG. 5 is an exploded perspective view on an enlarged scale of the bridge portion of the frame shown in FIGURE 1;

FIG. 6 is a diagrammatic view taken from the side showing how the nosepiece adjusts itself to noses of different contours;

FIG. 7 is a diagrammatic view taken from the front showing how the nosepiece adjusts itself to a nose when the sides of a nose have different angles of inclination;

FIG. 8 is a rear elevation of a modification of my nosepiece structure; and

FIG. 9 is a vertical section on an enlarged scale taken on the line 9—9 of FIGURE 8.

Similar reference characters refer to similar parts throughout the several views of the drawing.

In general, referring to the drawings, the front of the frame, generally indicated at 13, has an aperture 12 in its bridge portion. The nosepiece member, generally indicated at 10, has a section 10a which extends forwardly through aperture 12 (FIGURE 2). Section 10a is so mounted in aperture 12 that it is free to move forwardly and rearwardly (FIGURE 2) and also swing sideways (FIGURE 3) in the plane of the front so that it automatically adjusts itself to the shape of the nose on which it is positioned.

In detail, referring to FIGURES 1, 2 and 3, the front of the frame includes a top bar generally indicated at 14 which is composed of two metal sections 15 and 16 joined together over lenses 17 and 18. Lenses 17 and 18 are mounted on top bar 14 in any suitable manner. A pair of temples (not shown) are connected to the endpiece portions 14a and 14b of top bar 14 to complete the frame. In the center of the front, section 16 of top bar 14 extends downwardly, transversely and thence upwardly to section 15 to form aperture 12. As is best shown in FIGURE 2, sections 15 and 16 are round in cross section. Nosepiece member 10 may be molded from a plastic material and the vertical dimension of the forward portion of section 10a (FIGURE 2) is greater than the vertical distance between sections 15 and 16 of top bar 14 at aperture 12. Thus, in assembly, section 10a is pressed forwardly through aperture 12 until sections 15 and 16 snap into groove 20 and channel 21.

The nosepiece member 10, when viewed from the front, is U-shaped and includes a top portion 10b (FIGURE 3) and a pair of depending portions 10c and 10d. The depending portions 10c and 10d of the nosepiece member have their inner surfaces, such as surface 11 (FIGURE 2), shaped to form the pads or frame supporting surfaces of the nosepiece member. The forwardly extending section 10a at the top of the nosepiece member has the same general shape as aperture 12 (FIGURE 3) and groove 20 and channel 21 (FIGURES 2, 3 and 5) extend transversely across its upper and lower surfaces. It will be noted that in cross section, groove 20 has a slightly greater radius of curvature than the radius of section 15 (FIGURE 2). This permits member 15 to pivot freely on section 15. Channel 21 (FIGURE 2) has a flat bottom and is of substantially greater width than section 16. This permits nosepiece member 10 to move forwardly and rearwardly as it pivots on section 15. Movement forwardly and rearwardly is limited by the engagement of section 16 with the forward and rear walls of channel 21.

Nosepiece member 10 in addition to being moveable forwardly and rearwardly is so designed that it can rock sideways in the general plane of the front. To accomplish this, groove 20 and channel 21 (FIGURE 3) increase in depth as they extend outwardly from the center point 22 of section 10a. Thus, groove 20 slants downwardly in both directions as it extends outwardly from center point 22 and channel 21 slants upwardly in both directions as it extends outwardly from the same point. Thus, because leg portions 10c and 10d are positioned rearwardly of lenses 17 and 18 (FIGURE 2), nosepiece member 10 is free to rock sideways with respect to the front pivoting on center point 22 of section 10a. Movement of the nosepiece member in this manner is limited by the depth of the groove and channel at their outer ends. Thus, the lower portion of the nosepiece member is free to move forwardly and rearwardly with respect to the front of the frame and at the same time is free to adjust itself sideways in the plane of the front.

Referring to FIGURE 6, two different shapes of noses are shown in side elevation. The low bridge type of nose 30 is indicated in full lines and the position of the nosepiece member on this type of nose is also indicated in full lines. It will be noted that in this situation the nosepiece member swings rearwardly so that the pad surfaces on its depending portions 10c and 10d properly engage the nose. A nose of the high bridge type is indicated in dotted lines 31. On a nose of this type, it will be noted that nosepiece member 10 in dotted lines pivots forwardly so that its pad surfaces are again properly positioned to support a frame on this type of nose.

As pointed out above, in addition to noses which vary in a wide range of shapes between high and low bridges, the two sides of a nose are very seldom symmetrical. Thus, one side usually has a steeper angle of inclination than the other. In FIGURE 7 this type of problem is illustrated and it may be noted that the nosepiece member 10 has moved sideways on nose 32 from its vertical position indicated by line 33 to the angular position indicated by line 34. Thus, regardless of the type of nose on which nosepiece member 10 is placed, it is free to forwardly, and sideways adjust itself to fit the nose of the wearer. Thus, with my structure, the weight of the frame is supported equally by both of the pad surfaces of the nosepiece.

Referring to FIGURES 8 and 9, a modification of the embodiment described above is shown. This embodiment has all of the adjustable characteristics of the embodiment described hereinabove. However, this embodiment is designed for use in a situation where the nosepiece member cannot be snapped into assembled relationship with respect to the front. As is best shown in FIGURE 9, the nosepiece member, generally indicated at 40, has a forwardly extending section, generally indicated at 40a, composed of a section 40b extending through aperture 50 and a cap member 40c. The rear surface of cap member 40c forms the forward walls of groove 42 and channel 43 and the cap 40c is held in assembled relationship with section 40b by a pair of screws 45 and 46 (FIGURES 8 and 9). The screws 45 and 46 pass through holes in cap member 40c and thread into the top portion of nosepiece member 40.

Thus, in assembly, the forwardly extending section 40b is passed through aperture 50 between frame members 47 and 48. Next, cap member 40c is connected to the nosepiece section 40a. This type of construction permits assembly when a metal nosepiece member is used in conjunction with an aperture in a front which does not have sufficient resiliency to permit the nosepiece member to be snapped into assembled relationship. Once assembled, this embodiment has all of the adjustable features described hereinabove with respect to the embodiment shown in FIGURES 1 through 7.

Thus, it will be seen that adjustable nosepiece structure for an eyeglass or sunglass has been disclosed which in used automatically adjusts itself both forwardly and alo sideways of the front so that its pad surfaces properly contact the nose of the wearer. This results in frame structure which may be worn with a maximum of comfort and which does not require fitting to achieve this result. It also should be pointed out that with my structure, less bridge sizes are needed because it eliminates the need for fitting larger bridges than necessary when a smaller bridge does not set at the proper angle on a nose. It will be clear that the adjustable feature of this bridge may be used on different bridge designs and also on different bridge sizes. To change from one size to another, one size may be readily snapped out of assembled relationship and another size snapped in. It will thus be seen that the several objects mentioned hereinabove as well as many others have been accomplished.

As many possible embodiments may be made of the above invention and as many changes might be made in the embodiment above set forth, it is to be understood that all matter hereinbefore set forth or shown in the accompanying drawing is to be interpreted as illustrative and not in a limited sense.

What is claimed is:

1. In an adjustable nosepiece for a frame, in combination, means forming an elongated aperture in the bridge portion of said frame, said aperture having substantially straight upper and lower edges, a nosepiece member including a forwardly extending upper section and a pair of depending leg portions, pad means on said leg portions, means forming a groove extending longitudinally of the upper surface of said section, the upper edge of said aperture extending downwardly into said groove to pivotally mount said member on said front, and means forming a channel in and extending longitudinally of the lower surface of said section, said lower edge of said aperture extending upwardly into said channel, said lower edge being of a smaller size than said channel to permit movement of said nosepiece member forwardly and rearwardly with respect to said frame within a limited range, said groove and said channel slanting downwardly and upwardly respectively as they extend outwardly from the center of said forwardly extending section, whereby in addition to pivoting on the upper edge of said aperture said member is free to rock sideways in the plane of said front.

2. In an adjustable nosepiece for a frame, in combination, means forming an aperture in the bridge portion of said frame, a nosepiece member, said member including a pair of depending pad portions and a forwardly extending section, said section extending through said aperture, and a cap member detachably connected to the forward surface of said section, said cap member being of greater width than said aperture and forming with said section a groove and a channel in the upper and lower surfaces of said section respectively, said frame including portions extending into said groove and said channel, said channel in said lower surface having greater width than the portion of said frame extending into it and said groove in said upper surface coacting with the frame portion extending into it to pivotally mount said nosepiece member on said front, whereby said nosepiece member is free to pivot forwardly and rearwardly with respect to said front, the upper and lower surfaces of said forwardly extending section tapering downwardly and upwardly respectively as they extend outwardly from the center of said section, whereby said nosepiece member is free to rock sideways in the plane of said front.

References Cited

UNITED STATES PATENTS

| | | | |
|---|---|---|---|
| 361,385 | 4/1887 | Wells | 351—132 |
| 362,613 | 5/1887 | Dupaul | 351—132 |
| 2,176,368 | 10/1939 | Sweeney | 351—132 |
| 2,370,843 | 3/1945 | Croninger | 351—132 |
| 2,471,063 | 5/1949 | Devoe | 351—132 |
| 2,682,196 | 6/1954 | Baldanza et al. | 351—83 |
| 3,233,250 | 2/1966 | Johassen | 2—14.1 |

FOREIGN PATENTS

| | | |
|---|---|---|
| 305,421 | 2/1929 | Great Britain. |
| 380,725 | 9/1932 | Great Britain. |

DAVID H. RUBIN, *Primary Examiner.*